United States Patent
Carr et al.

(10) Patent No.: US 9,387,517 B2
(45) Date of Patent: Jul. 12, 2016

(54) FLUID DISTRIBUTION FOR A SHAKER

(75) Inventors: Brian S. Carr, Burlington, KY (US);
Benjamin L. Holton, Dayton, KY (US);
Michael A. Timmerman, Cincinnati, OH (US)

(73) Assignee: M-I L.L.C., Houston, TX (US)

( * ) Notice: Subject to any disclaimer, the term of this patent is extended or adjusted under 35 U.S.C. 154(b) by 1289 days.

(21) Appl. No.: 12/681,872

(22) PCT Filed: Oct. 2, 2008

(86) PCT No.: PCT/US2008/078523
§ 371 (c)(1),
(2), (4) Date: Apr. 6, 2010

(87) PCT Pub. No.: WO2009/048783
PCT Pub. Date: Apr. 16, 2009

(65) Prior Publication Data
US 2010/0237024 A1 Sep. 23, 2010

Related U.S. Application Data

(60) Provisional application No. 60/978,320, filed on Oct. 8, 2007, provisional application No. 61/034,430, filed on Mar. 6, 2008.

(51) Int. Cl.
*B01D 33/03* (2006.01)
*B01D 33/41* (2006.01)
(Continued)

(52) U.S. Cl.
CPC . *B07B 1/46* (2013.01); *B07B 13/16* (2013.01); *B09C 1/02* (2013.01); *B07B 2230/01* (2013.01)

(58) Field of Classification Search
USPC ......... 210/780, 232, 241, 767, 790, 800–802, 210/322, 323.1, 324, 332, 335, 336, 340, 210/359, 383, 384, 388, 455, 456, 213, 521, 210/288, 289; 175/206; 209/233, 311; 166/75.12
See application file for complete search history.

(56) References Cited

U.S. PATENT DOCUMENTS

| 4,234,416 A | 11/1980 | Lower et al. |
| 4,576,713 A | 3/1986 | Melin |
| 5,593,582 A * | 1/1997 | Roff, Jr. ......................... 210/325 |

FOREIGN PATENT DOCUMENTS

| DE | 29 24 506 A1 | 1/1981 |
| WO | 03/013690 A1 | 2/2003 |

(Continued)

OTHER PUBLICATIONS

International Search Report issued in PCT/US2008/078523, mailed on Jun. 15, 2009, 5 pages.
(Continued)

*Primary Examiner* — Ling Choi
*Assistant Examiner* — Catherine S Branch

(57) ABSTRACT

A shaker for separating solids from a drilling fluid includes a top screening deck (130), a flow-back pan (160) positioned beneath the top screening deck (130) for receiving an initially separated drilling fluid from the top screening deck. The flow-back pan (160) is divided into a plurality of channels (A, B, C, D). The shaker further includes a fluid distribution box (210), which includes a plurality of conduits (A, B, C, D). Each channel (A, B, C, D) of the flow-back pan (160) corresponds to one of the plurality of conduits (A, B, C, D) in the fluid distribution box (210) and each channel communicates a stream of the initially separated drilling fluid to the corresponding conduit. The shaker further includes a middle screening deck (140) and a bottom screening deck (150). Each conduit (A, B, C, D) routes the stream of initially separated drilling fluid to a corresponding one of the middle screening deck (140) and the bottom screening deck (150).

16 Claims, 6 Drawing Sheets

(51) Int. Cl.
    B01D 35/28    (2006.01)
    B07B 1/46     (2006.01)
    B07B 13/16    (2006.01)
    B09C 1/02     (2006.01)

(56) References Cited

FOREIGN PATENT DOCUMENTS

WO    2004/110589 A1    12/2004
WO    2007/070559 A1    6/2007

OTHER PUBLICATIONS

Written Opinion issued in PCT/US2008/078523, mailed on Jun. 15, 2009, 7 pages.

Office Action issued in corresponding European Application No. 08836849.3; Dated Aug. 2, 2011 (6 pages).

Examination Report issued in corresponding Canadian Application No. 2,701,834; Dated Aug. 2, 2011 (2 pages).

Office Action issued in corresponding Chinese Application No. 200880110780.8; Dated Jun. 5, 2012 (7 pages).

Office Action issued in corresponding European Application No. 08836849.3; Dated Jul. 4, 2012 (5 pages).

Office Action issued in corresponding Mexican Application No. MX/a/2010/003806 and English Reporting thereof dated Aug. 2, 2013 (8 pages).

Examination Report issued in corresponding Argentine application No. 068758; along with English language communication reporting the same; dated Nov. 14, 2012 (7 pages).

Office Action issued in corresponding Mexican application No. 2010/003806; along with English language communication reporting the same; dated Jan. 28, 2013 (8 pages).

Office Action issued in corresponding Mexican Application No. MX/a/2010/003806 along with an English language communication reporting the same; Dated Jul. 25, 2012 (6 pages).

* cited by examiner

FLUID DISTRIBUTION FOR A SHAKER

BACKGROUND

1. Field of the Disclosure

Embodiments disclosed herein relate to apparatus and methods for distributing fluid in a shaker.

2. Description of the Related Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drill string. Once the mud reaches the drill bit, it exits through various nozzles and ports where it lubricates and cools the drill bit. After exiting through the nozzles, the "spent" fluid returns to the surface through an annulus formed between the drill string and the drilled wellbore.

Furthermore, drilling mud provides a column of hydrostatic pressure, or head, to prevent "blow out" of the well being drilled. This hydrostatic pressure offsets formation pressures, thereby preventing fluids from blowing out if pressurized deposits in the formation are breached. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drill string and the borehole. Therefore, the fluid exiting the borehole from the annulus is a slurry of formation cuttings in drilling mud. Before the mud can be recycled and re-pumped down through nozzles of the drill bit, the cutting particulates must be removed.

Apparatus in use today to remove cuttings and other solid particulates from drilling fluid are commonly referred to in the industry as shale shakers or vibratory separators. A vibratory separator is a vibrating sieve-like table upon which returning solids laden drilling fluid is deposited and through which clean drilling fluid emerges. Typically, the vibratory separator is an angled table with a generally perforated filter screen bottom. Returning drilling fluid is deposited at the feed end of the vibratory separator. As the drilling fluid travels down the length of the vibrating table, the fluid falls through the perforations to a reservoir below, leaving the solid particulate material behind. The vibrating action of the vibratory separator table conveys solid particles left behind to a discharge end of the separator table. The above described apparatus is illustrative of one type of vibratory separator known to those of ordinary skill in the art. In alternate vibratory separators, the top edge of the separator may be relatively closer to the ground than the lower end. In such vibratory separators, the angle of inclination may require the movement of particulates in a generally upward direction. In still other vibratory separators, the table may not be angled, thus the vibrating action of the separator alone may enable particle/fluid separation. Regardless, table inclination and/or design variations of existing vibratory separators should not be considered a limitation of the present disclosure.

SUMMARY OF THE DISCLOSURE

In one aspect, the present disclosure relates to a shaker for separating solids from a drilling fluid. The shaker includes a top screening deck, a flow-back pan positioned beneath the top screening deck for receiving an initially separated drilling fluid from the top screening deck. The flow-back pan is divided into a plurality of channels. The shaker further includes a fluid distribution box, which includes a plurality of conduits. Each channel of the flow-back pan corresponds to one of the plurality of conduits in the fluid distribution box and each channel communicates a stream of the initially separated drilling fluid to the corresponding conduit. The shaker further includes a middle screening deck and a bottom screening deck. Each conduit routes the stream of initially separated drilling fluid to a corresponding one of the middle screening deck and the bottom screening deck.

In another aspect, the present disclosure relates to an apparatus for distributing an initially separated drilling fluid in a shaker. The shaker includes a top screening deck, onto which a solids laden drilling fluid is deposited and through which the initially separated drilling fluid comprising undersized solids passes, a middle screening deck, and a bottom screening deck. The apparatus includes a flow-back pan positioned beneath the top screening deck, wherein the flow-back pan is divided into a plurality of channels. The apparatus further includes a fluid distribution box including a plurality of conduits. Each channel of the flow-back pan directs the initially separated drilling fluid comprising undersized solids to a corresponding conduit of the fluid distribution box. Each conduit routes the initially separated drilling fluid comprising undersized solids to a corresponding one of the plurality of secondary screening surfaces.

In another aspect, the present disclosure relates to a method of separating solids from a drilling fluid. The method includes depositing the drilling fluid onto a top screening deck in a shaker, vibrating the shaker, separating the drilling fluid into an initially separated drilling fluid component and a first solid component on the top screening deck, discharging the first solid component from the shaker, receiving the initially separated drilling fluid component onto a flow-back pan comprising a plurality of channels, dividing the initially separated drilling fluid component into a plurality of streams defined by the channels on the flow-back pan, directing each stream of the initially separated drilling fluid component in each channel to a corresponding conduit in a fluid distribution box, and routing each stream of the initially separated drilling fluid component in each conduit to one of a middle screening deck and a bottom screening deck in the shaker.

Other aspects and advantages of the disclosure will be apparent from the following description and the appended claims.

DETAILED DESCRIPTION

In one aspect, embodiments disclosed herein relate to apparatus and methods for distributing fluid in a shaker. In particular, embodiments of the present disclosure provide fluid distribution apparatus and methods to distribute drilling fluid amongst multiple screening decks in the shaker.

Figure 1A:
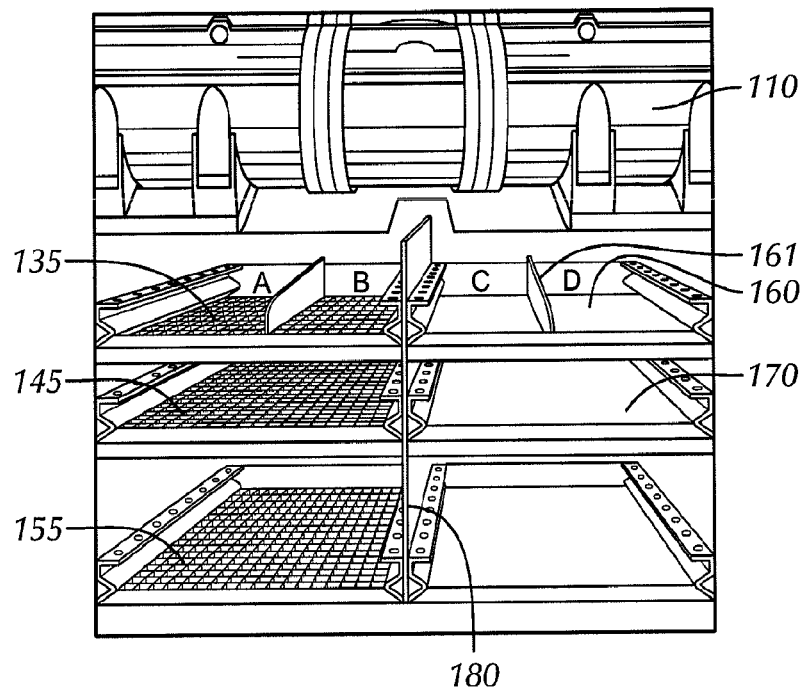
FIG. 1A shows a discharge end of a shaker in accordance with an embodiment of the present disclosure.
Figure 1B:
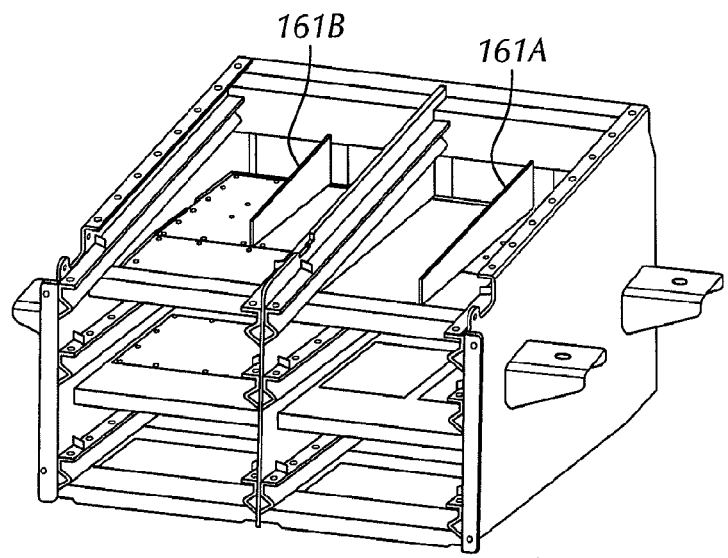
FIG. 1B shows an assembly view of a shaker with different configurations of a rib in accordance with embodiments of the present disclosure.
Figure 2A:
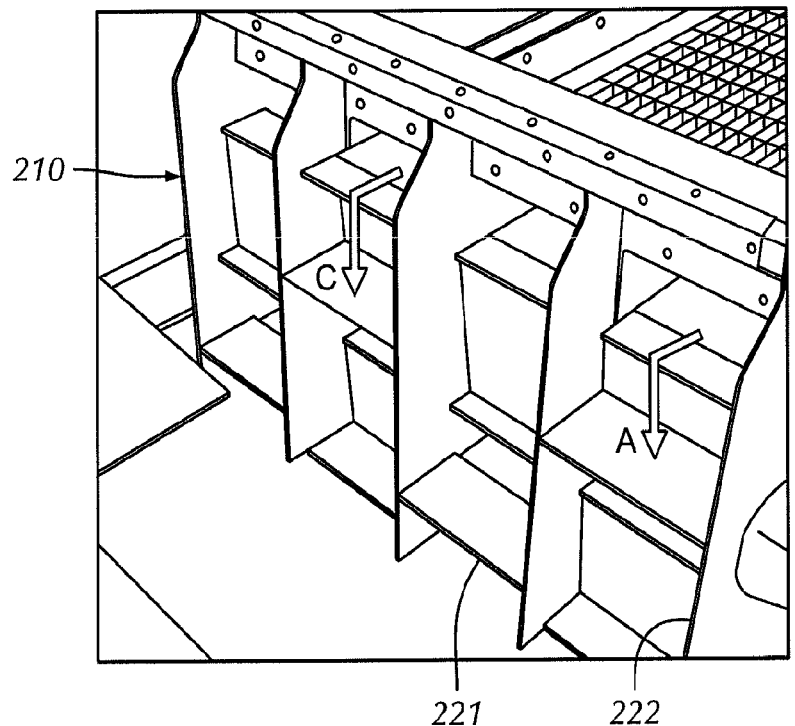
FIG. 2A shows an internal view of a fluid distribution box for the shaker shown in FIG. 1 in accordance with an embodiment of the present disclosure.
Figure 2B:
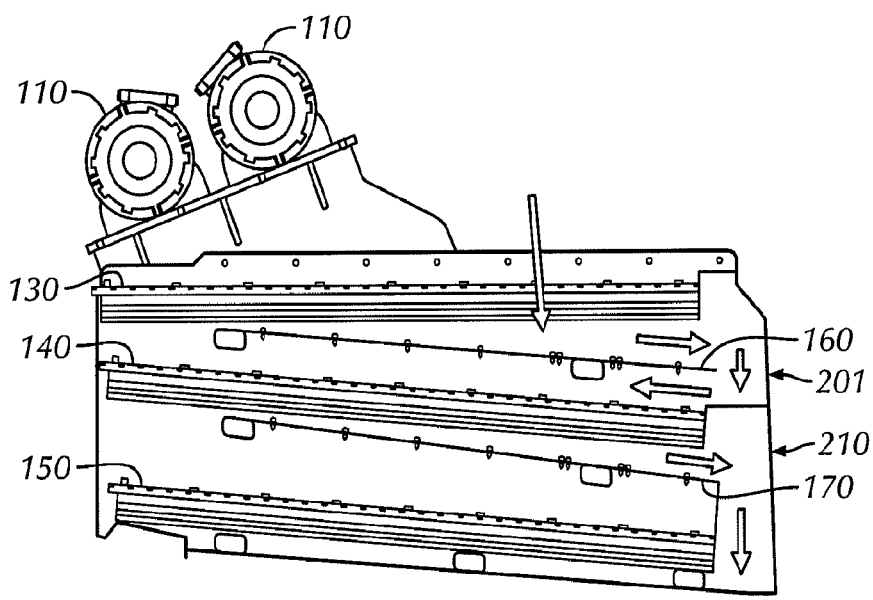
FIG. 2B shows a cut-away side view of the shaker shown in FIG. 1A.
Figure 3A:
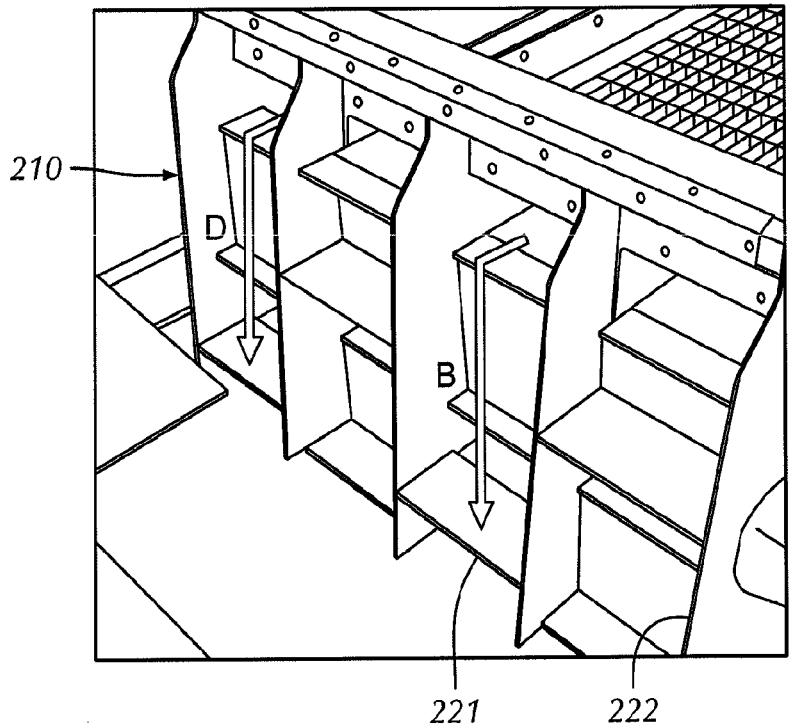
FIG. 3A shows an internal view of the fluid distribution box for the shaker shown in FIG. 1 in accordance with an embodiment of the present disclosure.
Figure 3B:
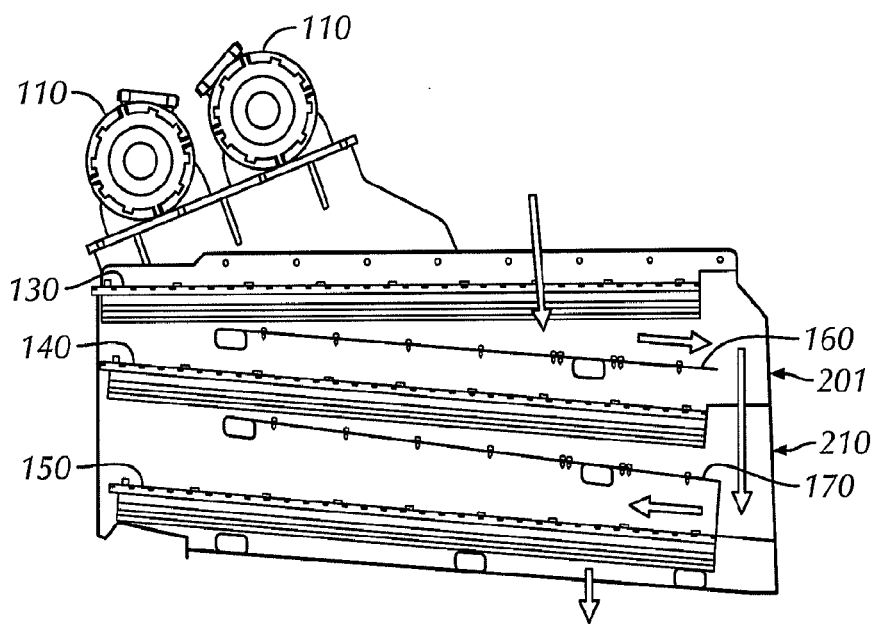
FIG. 3B shows a cut-away side view of the shaker shown in FIG. 1A.

FIGS. 1A, 1B, 2A, 2B, 3A, and 3B show a shaker in accordance with embodiments of the present disclosure. FIG. 1A is a view from the discharge end of the shaker. FIGS. 2A and 3A are views from the feed end of the shaker. FIGS. 2B and 3B are cut-away side views of the shaker illustrating parallel flow paths for drilling fluid within the shaker.

As shown in FIGS. 2B and 3B, the shaker includes a top screening deck 130, a middle screening deck 140, and a bottom screening deck 150. At least one motor 110 is attached to the shaker to provide vibratory motion while separating solids from drilling fluid. A mesh screen (not shown) is provided on each of the screening decks in order to filter out solids of various sizes from the drilling fluid according to the size of the respective mesh. In some embodiments, the mesh screen may be part of screen assemblies 135, 145, 155 (FIG. 1A) disposed on the top screening deck 130, the middle screening deck 140, and the bottom screening deck 150, respectively. Those of ordinary skill in the art will appreciate that the present disclosure is not limited to any particular screen assembly or mesh screen arrangement.

A flow-back pan 160 is provided to distribute drilling fluid between the middle screening deck 140 and the bottom screening deck 150. For illustration purposes in FIG. 1A, the screen assemblies 135, 145, 155 are removed from the right side to provide a view of the flow-back pan 160. The left side of the flow-back pan may be a mirror image of the right side. Further, the flow-back pan 160 may comprise two separate portions for the right side and the left side, divided by a partition wall 180. Those having ordinary skill in the art will appreciate that the arrangement and assembly of flow-back pan 160 may vary without departing from the scope of the present disclosure.

Continuing with FIG. 1A, flow-back pan 160 is disposed below top screening deck 130 and includes a plurality of channels for partitioning the flow of drilling fluid after initial separation of solids by top screening deck 130. In this particular embodiment, four channels (A, B, C, D) are included in the flow-back pan 160. The channels may be formed, for example, by providing a rib 161 between adjacent channels.

Referring to FIG. 1B, different configurations of rib 161 (FIG. 1A) are shown in accordance with embodiments of the present disclosure. As shown, rib 161A extends along a fill length of flow-back pan 160 and may be welded in place or secured with common fasteners. In alternate embodiments, rib 161B extends along only a portion of the entire length of flow-back pan 160, allowing a fluid to be more evenly distributed across flow-back pan 160 before being divided by rib 161B. Rib 161B may be welded onto a rear portion of flow-back pan 160. Those of ordinary skill in the art will appreciate that the channels may be formed in several ways without departing from the scope of the present disclosure. For example, either a full length rib 161A or a partial length rib 161B may be used in both compartments, or a combination of full length ribs 161A and short length ribs 161B may be used as shown. Further, in alternate embodiments, flow-back pan 160 may include upward bends between the channels to partition the channels from each other.

The flow distribution of the embodiment shown in FIGS. 1A, 1B, 2A, 2B, 3A, and 3B will now be described. For orientation purposes, the alphabetical labels for the channels (A, B, C, D) in FIG. 1A are also used for arrows illustrating corresponding flow paths. After initial separation of solids by the top screening deck 130, the initially separated drilling fluid flows into the plurality of channels in the flow-back pan 160. The initially separated drilling fluid then flows downward on the flow-back pan 160 from the discharge end of the shaker to the feed end of the shaker, as best seen in FIGS. 2B and 3B. At the feed end of the shaker, a fluid distribution box 210 is provided to route the flow from the plurality of channels to corresponding locations on the middle screening deck 140 and the bottom screening deck 150. In this embodiment, parallel flow is provided by the fluid distribution box 210 in conjunction with the flow-back pan 160, meaning that portions of the initially separated drilling fluid is routed to either the middle screening deck 140 or the bottom screening deck 150, not both.

The fluid distribution box 210 includes a plurality of conduits (A, B, C, D) corresponding to the plurality of channels in the flow-back pan 160. The plurality of conduits may be formed, for example, by horizontal partitions 221 and vertical partitions 222 in combination with a cover 201, which is removed for illustrative purposes in FIGS. 2A and 3A. The plurality of conduits in the fluid distribution box 210 route the drilling fluid from the corresponding channels in the flow-back pan 160 to the middle screening deck 140 or the bottom screening deck 150 in the parallel flow configuration shown in FIGS. 2A, 2B, 3A, and 3B.

FIGS. 2A and 2B illustrate the flow path for drilling fluid routed to the middle screening deck 140. FIGS. 3A and 3B illustrate the flow path for drilling fluid routed to the bottom screening deck 150. In the parallel flow configuration in this particular embodiment, the flow-back pan 160 includes four channels labeled A, B, C, and D from left to right when viewed from the discharge end of the shaker (FIG. 1A). After flowing towards the feed end of the shaker, drilling fluid in channels A and C is routed by the fluid distribution box 210 to the middle screening deck 140, as shown in FIGS. 2A and 2B. The drilling fluid flows through the middle screening deck 140 to separate smaller solids not initially separated by the top screening deck 130. Drilling fluid from the middle screening deck 140 then flows along a middle flow-back pan 170 towards the feed end of the shaker, where the drilling fluid then exits the shaker. A skid or sump (not shown) may be provided below the shaker to recover the drilling fluid for further use.

Continuing with the parallel flow configuration, drilling fluid in the channels B and D is routed by the fluid distribution box 210 to the bottom screening deck 150, as shown in FIGS. 3A and 3B. The drilling fluid flows through the bottom screening deck 150 to separate smaller solids not initially separated by the top screening deck 130. Drilling fluid from the bottom screening deck 150 may be allowed to immediately flow out of the bottom of the shaker onto the skid (not shown) provided below the shaker to recover the drilling fluid for further use.

Figure 4:
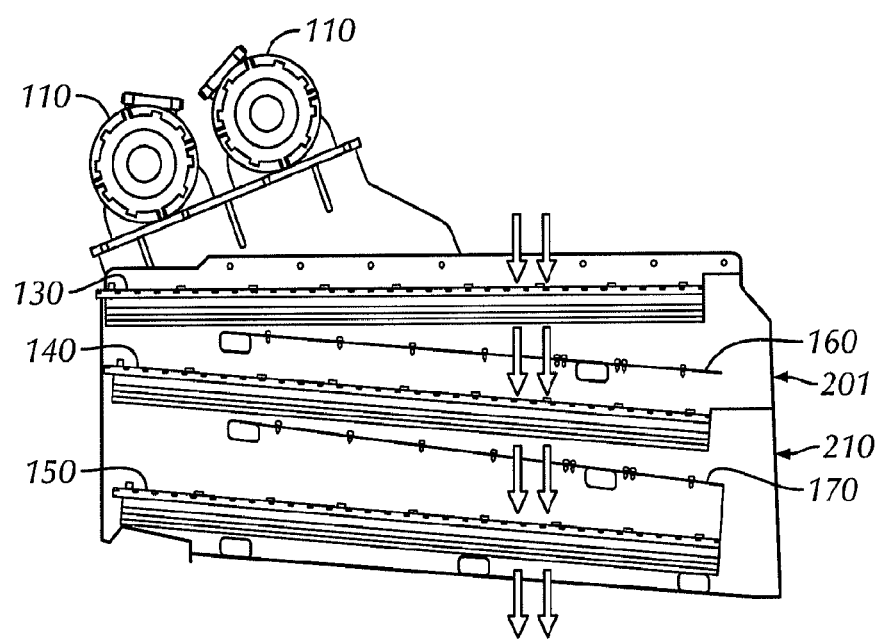
FIG. 4 shows a cut-away side view of a shaker in accordance with an embodiment of the present disclosure.

In one or more embodiments, the flow-back pan 160 may be configured to alternately allow series flow between the middle screening deck 140 and the bottom screening deck 150, meaning that at least a portion of the drilling fluid flows through both the middle screening deck 140 and the bottom screening deck 150, as shown in FIG. 4. In the series flow configuration, separation of solids from the drilling fluid may be accomplished in three stages using finer mesh with each successive screening deck to filter out smaller solids. For example, the mesh size for the top screening deck 130 may be selected to serve as a "scalping deck" to remove large drill cuttings from the drilling fluid. After initial separation, the middle screening deck 140 may have a mesh size selected to separate solids that can be recycled for further use. For example, the solids separated by the middle screening deck may include lost circulation material, which is used to avoid the loss of drilling fluid into the earth formation during drilling operations. Lost circulation material may be an expensive component of drilling fluid, and as such, the recovery of lost circulation material may result in decreasing total drilling expenditures. After flowing through the middle screening deck 140, the drilling fluid is further screened by the bottom screening deck 150, which may have a mesh size selected to remove fine solids. Fine solids in the drilling fluid may negatively affect the physical properties of the drilling fluid. Thus, removal of at least some of the fine solids may reduce negative effects on drilling, such as incorrect fluid weight and damaged drilling components. After flowing through the bottom screening deck 150, the drilling fluid exits through the bottom of the shaker to be recovered for further use. In one embodiment, solids separated by the middle screening deck 140 may be returned to the drilling fluid after screening by the bottom screening deck 150.

Figure 5A:
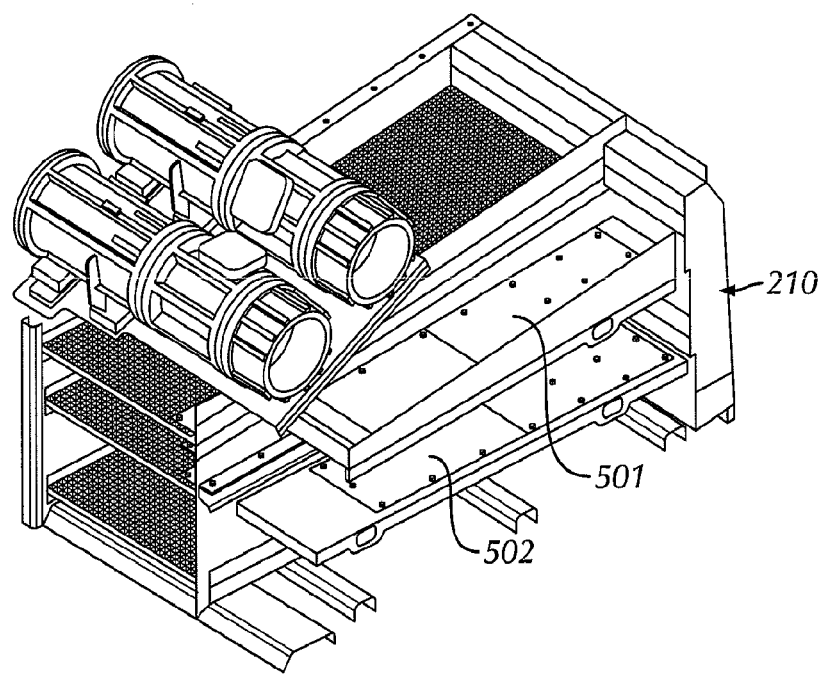
FIGS. 5A and 5B show a cut-away perspective view of a shaker in accordance with an embodiment of the present disclosure.
Figure 5B:
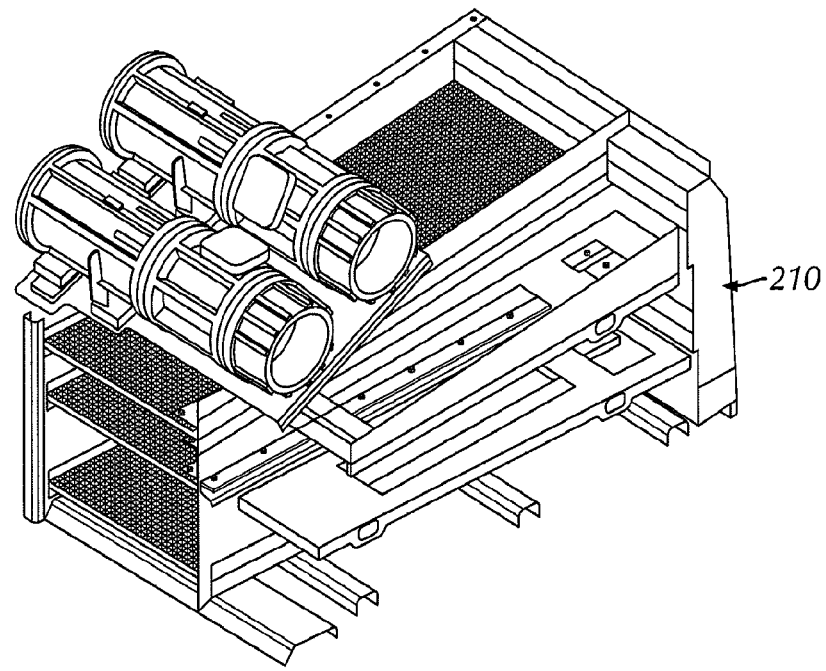
Figure 6A:
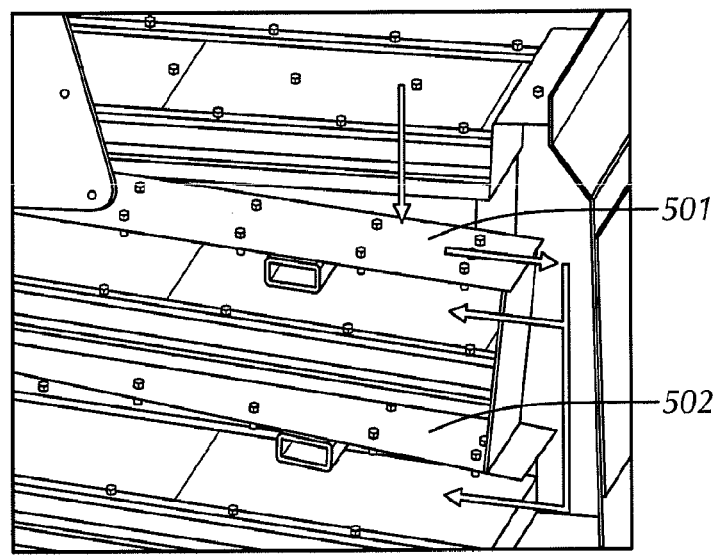
FIGS. 6A and 6B show a partial cut-away view of a shaker in accordance with an embodiment of the present disclosure.
Figure 6B:
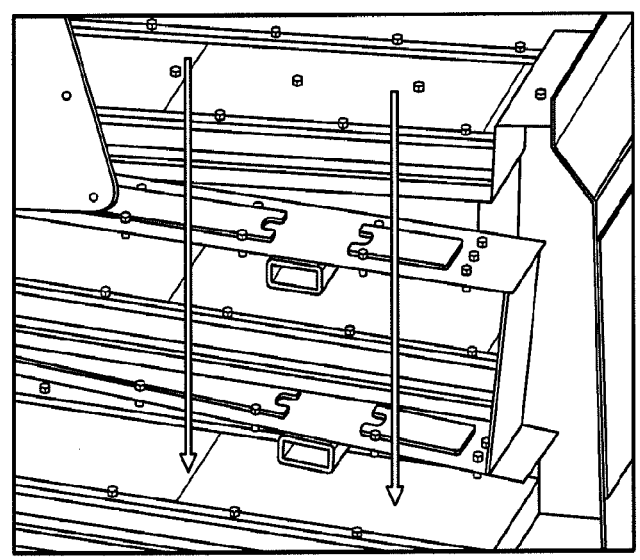

Switching between parallel and series flow may be accomplished in several ways. For example, the flow-back pan 160 and the middle flow-back pan 170 may include removable panels 501 and 502, respectively, as shown in FIGS. 5A and 6A. Removal of the removable panels 501 and 502 allows drilling fluid to flow through each of the screening decks in series, as shown in FIGS. 5B and 6B. To prevent drilling fluid from bypassing the middle screening deck 140, all or some of the conduits in the fluid distribution box 210 may be blocked. Embodiments of the present disclosure are not limited by the manner in which the conduits in the fluid distribution box 210 are blocked. For example, additional panels (not shown) may be inserted into the fluid distribution box 210. In one embodiment, the fluid distribution box 210 may be removable. Those having ordinary skill in the art will also appreciate that the configuration of removable panels 501 and 502 may vary without departing from the scope of the present disclosure. For example, the flow-back pan 160 and the middle flow-back pan 170 may each include one removable panel or several removable panels. Further, the removable panels may be attached to the shaker by bolts, latches, or other attachment mechanisms in order to be removable. In further embodiments, the flow-back pan 160 and the middle flow-back pan 170 may include slidable or otherwise movable panels, which may be moved between a parallel flow and a series flow position to vary the fluid distribution in the shaker.

Although the above embodiments describe shakers with three screening decks, those of ordinary skill in the art will appreciate that the above teachings may be scaled to apply to additional screening decks. Accordingly, the present disclosure is not limited to only three screening decks. Furthermore, the number of channels provided by the flow-back pan is not limited to the four channels shown in the above embodiments. In other embodiments, two channels may be provided by the flow-back pan. Alternatively, more than four channels may be provided by the flow-back pan.

While the present disclosure has been described with respect to a limited number of embodiments, those skilled in the art, having benefit of this disclosure, will appreciate that other embodiments may be devised that do not depart from the scope of the disclosure as described herein. Accordingly, the scope of the disclosure should be limited only by the attached claims.

What is claimed is:

1. A shaker for separating solids from a drilling fluid comprising:
    a top screening deck;
    a flow-back pan positioned beneath the top screening deck, the flow-back pan comprising a plurality of ribs extending along a length of a top surface of the flow-back pan to form a plurality of channels;
    a fluid distribution box disposed at an end of the flow-back pan, the fluid distribution box comprising a plurality of vertical partitions to form a plurality of conduits within the fluid distribution box;
    wherein each channel of the flow-back pan aligns with a conduit of the plurality of conduits in the fluid distribution box;
    at least one middle screening deck; and
    a bottom screening deck;
    wherein a first channel of the flow-back pan is in fluid communication with the middle screening deck through a first conduit of the fluid distribution box and second channel of the flow-back pan is in fluid communication with the bottom screening deck through a second conduit of the fluid distribution box.

2. The shaker of claim 1, wherein the flow-back pan comprises a flow-back surface having a central upward bend perpendicular to the fluid distribution box to divide the initially separated drilling fluid into two streams.

3. The shaker of claim 1, wherein the at least one middle screening deck and the bottom screening deck each comprise a screen having about the same mesh size.

4. The shaker of claim 1, wherein at least a portion of the flow-hack pan is configured to be removable, thereby allowing at least part of the initially separated drilling fluid to flow through both the at least one middle screening deck and the bottom screening deck.

5. The shaker of claim 1, wherein the flow-back pan is slidable to select between parallel and series flow in the at least one middle screening deck and the bottom screening deck.

6. The shaker of claim 1, wherein the shaker comprises two middle screening decks.

7. An apparatus for distributing an initially separated drilling fluid in a shaker, the apparatus comprising:
    a flow-back pan disposed beneath a screening surface, the flow back pan having a plurality of ribs extending along a length of a top surface of the flow-back pan to form a plurality of channels; and a fluid distribution box disposed at an end of the flow-back pan, the fluid distribution box comprising a plurality of conduits defined by a plurality of horizontal partitions and a plurality of vertical partitions, and each of the plurality of conduits corresponding to one of the plurality of channels of the flow-back pan;

wherein each of the plurality of horizontal partitions of the plurality of conduits is configured to route the initially separated drilling fluid to a corresponding one of a plurality of secondary screening surfaces.

8. The apparatus of claim 7, wherein the flow-back pan comprises a flow-back surface; and wherein adjacent channels of the flow-back pan are separated by a raised bend in the flow-back surface.

9. The apparatus of claim 7, wherein at least a portion of the flow-hack pan is configured to be removable from the shaker, thereby allowing at least part of the initially separated drilling fluid to flow through both the middle screening deck and the bottom screening deck.

10. The apparatus of claim 7, wherein the flow-back pan is configured to be slidable to select between parallel and series flow in the plurality of secondary screen surfaces within the shaker.

11. A method of separating solids from a drilling fluid comprising:

depositing the drilling fluid onto a top screening deck in a shaker;

vibrating the shaker;

separating the drilling fluid into an initially separated drilling fluid component and a first solid component on the top screening deck;

discharging the first solid component retained on the top screening deck from the shaker;

receiving the initially separated drilling fluid component onto a single flow-back pan disposed beneath the top screening deck, the single flow-back pan comprising a plurality of channels;

dividing the initially separated drilling fluid component into a plurality of streams defined by the channels of on the flow-back pan;

directing each stream of the initially separated drilling fluid component in each channel to a corresponding conduit in a fluid distribution box disposed at an end of the flow-back pan, wherein the fluid distribution box comprises a plurality of vertical partitions and horizontal partitions to define each conduit within the fluid distribution box; and routing each stream of the initially separated drilling fluid component from each channel of the flow-back pan through the corresponding in each conduit of the fluid distribution box to one of a middle screening deck and a bottom screening deck in the shaker.

12. The method of claim 11, wherein routing each stream of the initially separated drilling fluid component comprises:

routing a first stream of the initially separated drilling fluid component in a first conduit of the fluid distribution box to the middle screening deck in the shaker; and routing a second stream of the initially separated drilling fluid component in a second conduit of the fluid distribution box to the bottom screening deck in the shaker.

13. The method of claim 12, wherein the middle screening deck in the shaker comprises a first middle screening deck and a second middle screening deck, the method further comprising:

routing the first stream of the initially separated drilling fluid component in the first conduit of the fluid distribution box to the first middle screening deck in the shaker; and routing a third stream of the initially separated drilling fluid component in a third conduit of the fluid distribution box to the second middle screening deck in the shaker.

14. The method of claim 11, further comprising:

removing at least a portion of the flow-back pan from the shaker, thereby allowing at least part of the initially separated drilling fluid to flow through both the middle screening deck and the bottom screening deck.

15. The method of claim 11, further comprising:

moving the flow-back pan to select between parallel and series flow in the middle screening deck and the bottom screening deck within the shaker.

16. The method of claim 11, wherein the plurality of partitions comprises a plurality of vertical partitions and a plurality of horizontal partitions, wherein the plurality of vertical partitions form each channel within the fluid distribution box and the plurality of horizontal partitions route each stream of the initially separated drilling fluid to one of the middle screening deck and the bottom screen deck in the shaker.

\* \* \* \* \*